United States Patent [19]

Buisson et al.

[11] Patent Number: 4,937,754

[45] Date of Patent: Jun. 26, 1990

[54] PROCESS AND SYSTEM FOR DETERMINING THE LONGITUDINAL POSITION OF THE CENTER OF GRAVITY OF AN AIRCRAFT PROVIDED WITH AN ADJUSTABLE HORIZONTAL STABILIZER AND APPLICATION TO THE MONITORING OF SAID CENTER OF GRAVITY NEAR THE FOCUS OF THE AIRCRAFT

[75] Inventors: Dominique Buisson, Villemur; Augustin Moline, Pibrac, both of France

[73] Assignee: Aerospatiale Societe Nationale Industrielle, Paris, France

[21] Appl. No.: 251,705

[22] PCT Filed: Jan. 4, 1988

[86] PCT No.: PCT/FR88/00002

§ 371 Date: Aug. 12, 1988

§ 102(e) Date: Aug. 12, 1988

[87] PCT Pub. No.: WO88/05162

PCT Pub. Date: Jul. 14, 1988

[30] Foreign Application Priority Data

Jan. 8, 1987 [FR] France ................................. 87 00116

[51] Int. Cl.$^5$ .............................................. G01M 1/12
[52] U.S. Cl. ......................................... 364/463; 73/65
[58] Field of Search .................... 364/463, 428; 73/65, 73/178 T; 235/61 T; 940/959

[56] References Cited

U.S. PATENT DOCUMENTS

| | | | |
|---|---|---|---|
| 3,584,503 | 6/1971 | Senour | 73/65 |
| 3,701,279 | 10/1972 | Harris et al. | 73/65 |
| 4,110,605 | 8/1978 | Miller | 364/463 |
| 4,545,019 | 10/1985 | Glover | 73/65 |
| 4,622,639 | 11/1986 | Adelson et al. | 364/463 |
| 4,639,872 | 1/1987 | McHale et al. | 364/463 |

FOREIGN PATENT DOCUMENTS 2381998 9/1978 France .

*Primary Examiner*—Gary Chin
*Attorney, Agent, or Firm*—Fisher, Christen & Sabol

[57] ABSTRACT

Method and system for determining the longitudinal position of the gravity center of an aircraft provided with an adjustable stabilizer. At a point of flight for which the aircraft is in equilibrium with its elevator in aerodynamic prolongation of the adjustable stabilizer and when the gravity center is at the vicinity of the focus of the aircraft, the gravity center position is calculated from: the position ($X_F$) of the focus (F) of the aircraft, the measurement of the deflection (iH) of the adjustable stabilizer, a first function K(M, N1) of the engine speed (N1) of the engines of the aircraft and the Mach number (M); and a second function of such Mach number. There is application to the monitoring of the gravity center of a flying aircraft.

8 Claims, 5 Drawing Sheets

PROCESS AND SYSTEM FOR DETERMINING THE LONGITUDINAL POSITION OF THE CENTER OF GRAVITY OF AN AIRCRAFT PROVIDED WITH AN ADJUSTABLE HORIZONTAL STABILIZER AND APPLICATION TO THE MONITORING OF SAID CENTER OF GRAVITY NEAR THE FOCUS OF THE AIRCRAFT

FIELD OF THE INVENTION

The present invention relates to a process and a system for determining the longitudinal position of the centre of gravity of an aircraft provided with an adjustable horizontal stabilizer, as well as to an application to the monitoring of said centre of gravity near the focus of the aircraft.

BACKGROUND OF THE INVENTION

Wide body aircraft, such as for example the AIRBUS A 310-300, are already known, which possess an adjustable horizontal stabilizer in which, in order to increase the radius of action, an additional fuel tank has been disposed. Generally, in such aircraft, the centre of gravity is located in front of the point of application of the lift (focus) and the stabilizer lift is in fact a downwardly directed negative lift. As a result, the lift of the wing unit must be increased by as much, which involves an additional drag. In order to improve the performances of the aircraft by reducing the drag, it is necessary to move the centre of gravity back as much as possible. In fact, the more the centre of gravity is moved back, the less the moment exerted by the stabilizer negative lift with respect to the centre of gravity and therefore the less the additional lift and drag.

In these aircraft, the additional fuel tank of the adjustable horizontal stabilizer is thus in connection with the principal fuel tank arranged in the wing unit and a system for transferring fuel, incorporating regulator, between said additional and principal tanks is provided. Consequently, the quantity of fuel contained in the additional tank may be regulated so that the centre of gravity of the aircraft is longitudinally as far back as possible, whilst remaining within a range in which the aircraft is manually pilotable. If, for any reason, the system ensuring regulation deviated, the centering of the aircraft might become If the centre of gravity is moved too much to the rear, the aircraft would become unstable, and, the aircraft would become difficult to pilot due to the excessive demands on the pilots.

Said regulator thus controls the transfer of the fuel from the principal front tank towards the additional rear tank, or vice versa, so as to reduce the static margin, by placing and maintaining the centre of gravity of the aircraft as far to the rear as possible, whilst keeping a margin vis-à-vis the point where the aircraft is no longer pilotable. In practice, it is desirable to maintain the centre of gravity near the focus, and sometimes between the focus and the point of manoeuvring, which lies to the rear of said focus and which is defined as the point where the elevator has an infinite efficiency on the load factor of the aircraft.

SUMMARY OF THE INVENTION

The object of the present invention is a reliable and precise process for determining the longitudinal position of the centre of gravity of an aircraft near the focus and, more particularly, a monitoring system completely independent of the fuel regulating system, allowing a detection of breakdowns which could not be seen by the monitorings of said regulation system, whilst making it possible to multiply the probabilities of breakdown detection and thus to ensure overall security.

To that end, according to the invention, the process for determining the longitudinal position of the centre of gravity of an aircraft provided with an adjustable horizontal stabilizer, is noteworthy in that, at a point of flight for which said aircraft is in equilibrium with its elevator in aerodynamic extension of said adjustable horizontal stabilizer and when said centre of gravity lies near the focus of said aircraft, said position of the centre of gravity is calculated from:

the position of the focus of said aircraft;

the measurement of the deflection of said adjustable horizontal stabilizer;

a first function of the speed of the aircraft engines and of the Mach number, this first function being representative of the value of deflection of said adjustable horizontal stabilizer, in the case of said centre of gravity being located at the focus of said aircraft; and a second function of said Mach number, this second function being representative of the deviation of deflection of said horizontal stabilizer for a deviation of 1% from the position of the centre of gravity.

As will be seen in greater detail hereinafter, the present invention takes advantage of the fact that the deflection of the adjustable horizontal stabilizer, when the aircraft is trimmed, i.e. when the equilibrium in pitch moment is effected and the elevator presents a zero angle of incidence with respect to said stabilizer, is a function of the flight conditions and of the position of the centre of gravity of the aircraft. The present invention exploits in a particular manner the laws of flight mechanics, and in particular the equation of the moment of pitch of the aircraft about the centre of gravity thereof.

In this way, in the process according to the invention, the longitudinal position of the centre of gravity of the aircraft, near the focus, is determined solely from a structural datum of the aircraft (position of the focus), from data (Mach number and engine speed) measured in flight and moreover already processed or elaborated by the systems of the aircraft for other purposes and therefore already available, and from the measurement of the deflection of the adjustable horizontal stabilizer.

As will be demonstrated hereinafter, the process of the invention advantageously employs the following equation:

$$x_G = x_F = \frac{iH - K(M, N1)}{H(M)}$$

in which:

$x_G$ is the abscissa of the effective position of the centre of gravity G, measured along the longitudinal axis of the aircraft from a reference origin and referred to the mean aerodynamic chord (generally designated by MAC) of the principal wing unit of said aircraft;

$x_F$ is the abscissa of the position of the centre of gravity G for which the coefficient of lift of the aircraft has no influence on the deflection of equilibrium of the adjustable horizontal stabilizer, i.e. the position for which said centre of gravity lies at the focus of the complete aircraft, this abscissa being measured along the longitudinal axis of the aircraft from said reference origin and also being referred to said mean aerodynamic chord;

iH is the measurement, at the point of flight in question, of the real deflection of the adjustable horizontal stabilizer for the trimmed aircraft;

K(M,N1) is the first function of the speed N1 of the engines of the aircraft and of the Mach number M at the point of flight in question; and H(M) is the second function of the Mach number at said point of flight.

The function K(M,N1) is linked with the geometry of the aircraft and with that of its engines. It may be in the form of a table with two inputs—the input of the parameter M and the input of the parameter N1—and with one output giving the value of the function for pairs of particular values of said input parameters. Said function may be determined either by calculation or from tests in flight and/or in a wind tunnel.

The function K(M,N1), which, as indicated above, is representative of the value of deflection of said adjustable horizontal stabilizer in the case of the centre of gravity lying at the focus, may advantageously be in the form of three functions, each of one sole variable, for example of the type:

$$K(M,N1)=F(M)+G1(N1)\cdot G2(M)$$

in which:

F(M) is a function of the sole Mach number M, representative of the aerodynamics of the aircraft;

G1(N1) is a function of the sole engine speed N1, and

G2(M) is a function of the sole Mach number M, representative of the moment of pitch due to the thrust of the engines.

In the composition of the function K(M,N1), the influence of the geometry of the aircraft is thus dissociated from the overall influence of its engines.

In order to know the value of said function at the point of flight in question, it is necessary to know the corresponding value of each of the two parameters which are the Mach number M and the engine speed N1.

The Mach number may for example be furnished by the on-board computer ADC (Air Data Computer), whilst the engine speed is directly delivered by the monitoring device associated therewith.

The process according to the invention therefore makes it possible to calculate the position of the centre of gravity of the aircraft in flight independently of measurements made on the ground and solely from parameters already elaborated, with the exception of the measurement of deflection of the adjustable horizontal stabilizer which necessitates a conventional angle measuring system.

A system employing this process may thus furnish an indication of the position of the centre of gravity, which may be presented directly in visual form for example on cathode-ray tubes or be used in computers, either for elaborating particular functions where it is necessary to take into account the centering, or for checking functions elaborated by different ways.

Such a system may in particular be used for checking results obtained by another method or, as will be described hereinafter, for detecting an extreme limiting position and triggering off an alarm system.

Thus, according to the present invention, a system for determining the longitudinal position of the centre of gravity of an aircraft provided with an adjustable horizontal stabilizer according to the process defined hereinabove, is noteworthy:

in that it comprises:

a computer, an angular position sensor associated with said adjustable horizontal stabilizer;

a first device capable of delivering information representative of the speed of the aircraft engines;

a second device capable of delivering information representative of the Mach number;

memory means in which said functions are stored, said memory means receiving the information delivered by said first and second devices and delivering at their output the corresponding values of said functions;

and in that said computer receives information on the position of the focus of the aircraft in addition to the information delivered by said memory means, as well as that delivered by said angular position sensor.

An interesting application of the process according to the invention consists in monitoring the longitudinal position of the centre of gravity of an aircraft provided with an adjustable horizontal stabilizer, said monitoring being effected with respect to at least one limiting position of said centre of gravity, chosen near the focus of said aircraft.

According to this application in accordance with the invention, at a point of flight for which said aircraft is in equilibrium with its elevator in aerodynamic extension of said adjustable horizontal stabilizer:

the deflection of said adjustable horizontal stabilizer is measured;

the value of a function k(M,N1) of the speed (N1) of the aircraft engines and of the Mach number (M) is determined, this function being representative of the value of deflection of said adjustable horizontal stabilizer, in the case of said centre of gravity lying in said limiting position adjacent said focus;

said measured deflection and the value of said function k(M,N1) are compared; and it is deduced from the comparison whether the centre of gravity lies in front of or to the rear of said limiting position.

Similarly to what has been said concerning the function K(M,N1), the function k(M,N1) is linked with the geometry of the aircraft and its engines. It may be in the form of a table with two inputs—the input of parameter M and the input of parameter N1—and with one output giving the value of the function for couples of particular values of said input parameters. Said function may be determined either by calculation or from tests in flight and/or in wind tunnel.

The function k(M,N1) may also advantageously be in the form of the combination of three functions, each of one sole variable, for example of the type:

$$k(M,N1)=f(M)+G1(N1)\cdot G2(M)$$

in which:

f(M) is a function of the sole Mach number M, representative of the aerodynamics of the aircraft;

G1(N1) is a function of the sole engine speed N1, and

G2(M) is a function of the sole Mach number M, representative of the moment of pitch due to the thrust of the engines.

In this way, in the composition of the function k(M,N1), the influence of the geometry of the aircraft is also dissociated from the overall influence of its engines.

Experience has shown, and calculation confirms, that the functions G1(N1) and G2(M) might be the same for the functions K(M,N1) and k(M,N1).

In this way, as before, in order to know the value of said function k(M,N1) at the point of flight in question, it suffices to know the corresponding value of each of the two parameters which are the Mach number M and the engine speed N1.

In an advantageous embodiment of the process of monitoring according to the invention, the respective values of at least two functions k(M,N1) and k'(M,N1) are determined, these functions being respectively representative of the values of deflection of said adjustable horizontal stabilizer, in the case of said centre of gravity lying in limiting positions which are distinct from but close to said focus, the measured deflection is compared with each of said function values and the relative position of said centre of gravity with respect to said limiting positions is deduced from these comparisons.

In order to carry out the process according to the invention for monitoring the longitudinal position of the centre of gravity of an aircraft provided with an adjustable horizontal stabilizer, a system is provided, comprising:

an angular position sensor associated with said adjustable horizontal stabilizer;

a first device capable of delivering information representative of the speed of the aircraft engines;

a second device capable of delivering information representative of the Mach number;

memory means in which is stored at least one function k(M,N1), said memory means receiving the information delivered by said first and second devices and delivering at their output the corresponding values of said function;

a comparator capable of comparing the information delivered by said position sensor (9) and the information delivered by said memory means; and an alarm device triggered off by said comparator.

In the case of said memory means being capable of delivering a plurality of functions k(M,N1), as many comparators are provided as functions.

BRIEF DESCRIPTION OF THE DRAWINGS

The invention will be more readily understood on reading the following description with reference to the accompanying drawings, in which.

DETAILED DESCRIPTION OF PREFERRED EMBODIMENTS

Figure 1:
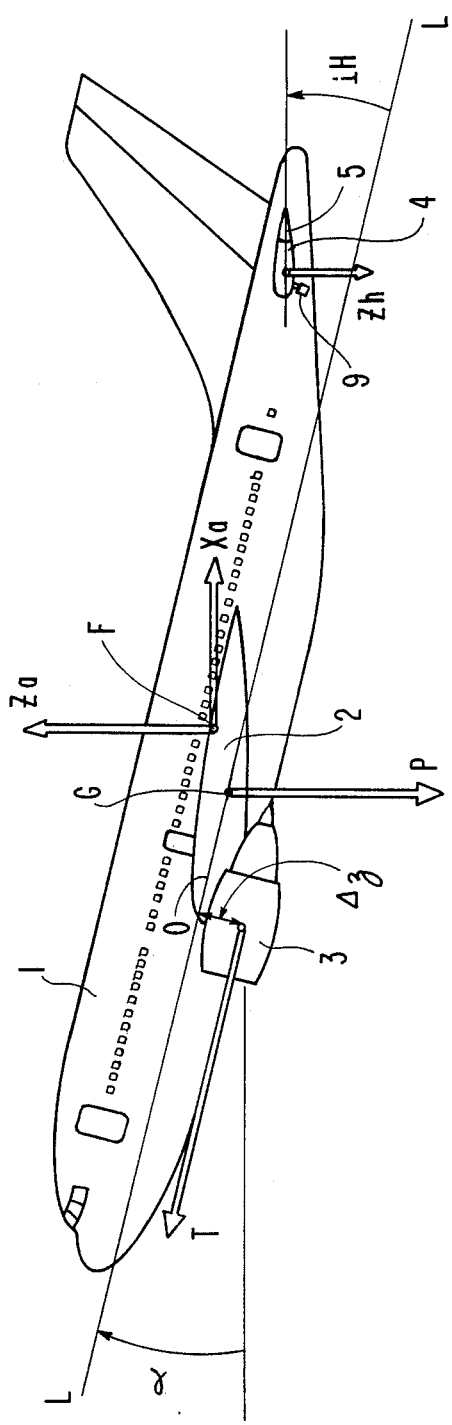
FIG. 1 schematically shows a wide body aircraft and the system of the forces intervening in the equilibrium in moment of pitch.

The wide-body aircraft 1, shown in FIG. 1, presents a longitudinal axis L—L and comprises a principal wing unit 2 supporting engines 3 and an adjustable horizontal stabilizer 4, often called adjustable horizontal plane and designated by the abbreviation PHR. When this aircraft is not subjected to any movement of roll or of gyration, it essentially undergoes the action of the following forces:

its weight P, applied to the centre of gravity G and, of course, directed downwardly;

the aerodynamic lift Za of the complete aircraft, applied to the focus F and directed upwardly;

the aerodynamic drag Xa of the complete aircraft, applied to the focus F and directed rearwardly;

the thrust T of the engines 3 parallel to the axis L—L, directed forwardly and applied at a point of which the distance to said axis L—L is equal to $\Delta z$; and the aerodynamic negative lift Zh, directed downwardly, of the adjustable horizontal stabilizer 4, deflected by an angle iH with respect to axis L—L.

The weight P being applied to the centre of gravity G, its moment with respect to the latter is zero. Furthermore, the distance separating the focus F from the axis L—L generally being very short (to the point of considering that said focus F lies on axis L—L), the moment arm of the aerodynamic drag Xa with respect to the centre of gravity G is zero, with the result that the moment of said aerodynamic drag Xa with respect to the centre of gravity G is also zero.

Consequently, it may be considered with a good approximation that the resultant moment of pitch about the centre of gravity G comprises the following components:

a moment M1, generated by the thrust T of the engines 3 and equal to the product $T \cdot \Delta z$;

a moment M2, generated by the aerodynamic lift Za; and a moment M3, generated by the aerodynamic negative lift Zh.

To these three components must be added a fourth, M4, corresponding to the aerodynamic pitch for a zero lift and a likewise zero deflection iH of the stabilizer 4. To this end, a coefficient of aerodynamic pitch moment for a zero lift and a zero deflection iH is defined, this coefficient being designated by Cmo.

If S designates the reference surface of the wing unit, 1 the reference chord (or mean aerodynamic chord) of the wing unit and Pd the dynamic pressure at the point of flight in question, the moment M4 is equal to the product $S \cdot Pd \cdot l \cdot Cmo$. It will be noted that if, as is usual, an original O is chosen on axis L—L and if the abscisae $x_G$ and $x_F$ of points G and F (the latter being assumed to be on axis L—L) are expressed in % of said reference chord 1, moment M2 is equal to the product $Za(x_G - x_F) \cdot l$.

Furthermore, if $Z\alpha h$ is called the gradient of negative lift of the horizontal stabilizer 4 corresponding to the local angle of incidence of the stabilizer 4, moment M3 is equal to the product $Z\alpha h \cdot iH \cdot l$.

When aircraft 1 is trimmed, i.e. when the equilibrium in pitch moment is effected and the elevator 5, borne by the trailing edge of the stabilizer 4, is in aerodynamic extension of said stabilizer (zero deflection), the equilibrium in pitch moment is written:

$$M1 + M2 + M3 + M4 = 0 \qquad (1)$$

By replacing, in this equation (1), the different moments M1, M2, M3 and M4 by the values indicated above, the following is therefore obtained:

$$T \cdot \Delta z + Za \cdot (x_G - x_F) \cdot l + Zah \cdot iH \cdot l + S \cdot Pd \cdot l \cdot Cmo = 0 \quad (2)$$

It will be noted that if Cz is called the coefficient of lift of the complete aircraft and Czαh the coefficient of the gradient of negative lift of the stabilizer 4, the following may be written:

$$Za = -S \cdot Pd \cdot Cz \quad (3)$$

and $$Zah = S \cdot Pd \cdot Czah \quad (4)$$

Consequently, equation (2) may be written:

$$T \cdot \Delta z + S \cdot Pd \cdot l[-Cz(x_G - x_F) + Czah \cdot iH + Cmo] = 0 \quad (5)$$

If iHRef is called the particular value of the deflection iH corresponding to equilibrium when points G and F are merged, the following is obtained:

$$T \cdot \Delta z + S \cdot Pd \cdot l[Czah \cdot iHRef + Com] = 0 \quad (6)$$

From equations (5) and (6) may be deduced:

$$x_G - x_F = \frac{iH - iHRef}{\frac{Cz}{Czah}} \quad (7)$$

It will be noted that the ratio Cz/Czαh corresponds to the value of the deviation of deflection iH−iHRef for which $x_G - x_F = 1\%$.

Furthermore, when the centre of gravity G is near focus F, the term $x_G - x_F$ is weak and the effects of Cz may be approximated as a function of a mean value of Cz. It may therefore then be admitted that the function Cz/Czαh—is a value H(M) independent of Cz, but able to vary with the Mach number M.

The following may then be written:

$$x_G - x_F = \frac{iH - iHRef}{H(m)} \quad (8)$$

In that case, the deviation of position of the centre of gravity with respect to the focus may thus be represented by a value proportional to the deviation of the angle of deflection of the stabilizer 4 with respect to the reference value iHRef.

Moreover, from equation (6), it is seen that iHRef depends on T, i.e. on the speed N1 of the engines, and from Czαh and Cmo, i.e. the Mach number M. The parameter iHRef may therefore be considered as a function dependent on parameters N1 and M. Such a function may for example be written in the form:

$$iHRef = F(M) + G1(N1) \cdot G2(M) \quad (9)$$

in which F(M) represents Cmo/Czαh'

$$\frac{T \cdot \Delta z}{S \cdot Pd \cdot l \cdot Czah}$$

Figure 2:
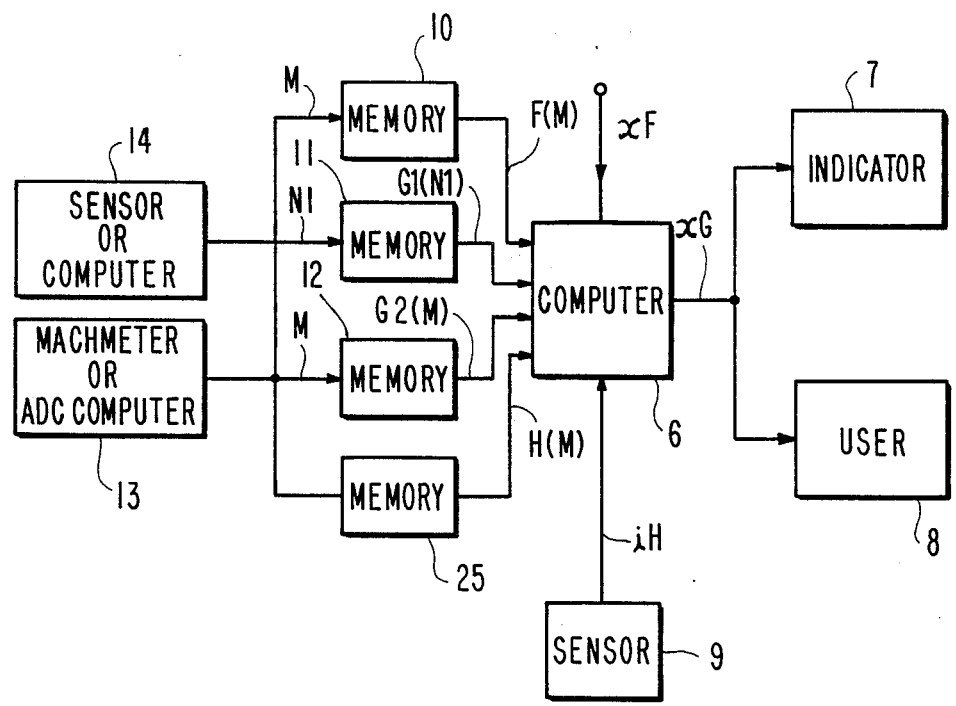
FIG. 2 gives a block diagram of an embodiment of a system according to the invention.

For carrying out the present invention, a system is provided which is taken on board the aircraft 1 and of which the block diagram is given in FIG. 2. This system comprises a computer 6 capable of addressing the instantaneous position of the centre of gravity G, i.e. the calculated magnitude $x_G$ defined hereinabove, to one or more indicators 7 and/or to one or more users 8 such as for example flight control computers.

The computer 6 receives, or has stored, the magnitude $x_F$ which is a constructional characteristic of the aircraft 1 and which, as mentioned hereinabove, defines the position of focus F. Moreover, a sensor 9 (cf. also FIG. 1), for example of the synchrotransmitter type, detects the angular position of the adjustable stabilizer 4 and addresses the value iH to said computer 6.

With said computer 6 are associated memories 10, 11, 12 and 25 containing the different functions useful for calculating the magnitude $x_G$. Memories 10, 12 and 25 receive from a Machmeter or an ADC computer 13 the value M of the Mach number. Moreover, memory 11 receives from a sensor or a computer 14 associated with engines 3 the value of speed N1.

In memories 10, 11 and 12 are respectively contained the functions F(M), G1(N1) and G2(M), which are transmitted to computer 6. In this way, the latter may calculate iHRef by the equation (9). In memory 25 is contained the function H(M). Computer 6 may therefore calculate $x_G$ by equation (8).

FIGS. 3, 4, 5 and 6 respectively show examples of functions F(M), G1(N1), G2(M) and H(M) relative to an AIRBUS aircraft, type A310. The functions F(M) and G2(M) are expressed in degrees of angle, whilst the function G1(N1) is a number without dimension. The function H(M) is expressed in degrees per percent. It may be seen that to any current value Mj (or at least to a plurality of such current values) of the Mach number M there corresponds a particular value Fj, a particular value G2j and a particular value Hj respectively of functions F(M), G2(M) and H(M) and that to any current value N1j (or at least to a plurality of such current values) of the engine speed N1 there corresponds a particular value G1j of the function G1(N1). In this way, for a plurality of pairs of values Mj,N1j, the corresponding values of the function iHRef are obtained which are transmitted to computer 6.

Functions F(M), G1(N1) and G2(M) are characteristic of the geometry of the aircraft 1 and of its engines 3. They may be established by theoretical calculation or by measurements.

In the case of it being desired to define for the centre of gravity G a limiting position, for example with a view to an alarm, formula (8) mentioned hereinabove shows that the abscissa $x_G$ lim of this limiting position is given by:

$$x_G \text{ lim} - x_F = \frac{iHlim - iHRef}{H(M)} \quad (9)$$

iHlim being the value of iH corresponding to $x_G$ lim.

Since $x_G$, and therefore a fortiori $x_G$ lim, are close to $x_F$, it is deduced that iHlim is also close to iHRef. Furthermore, since iHRef is, as shown hereinabove, a function K(M,N1) of the two parameters M and N1, it may, with a good approximation, be considered that iHlim is also a function k(M,N1) of these two parameters, the two functions K(M,N1) and k(M,N1) being of identical form and close to each other.

Figure 3:
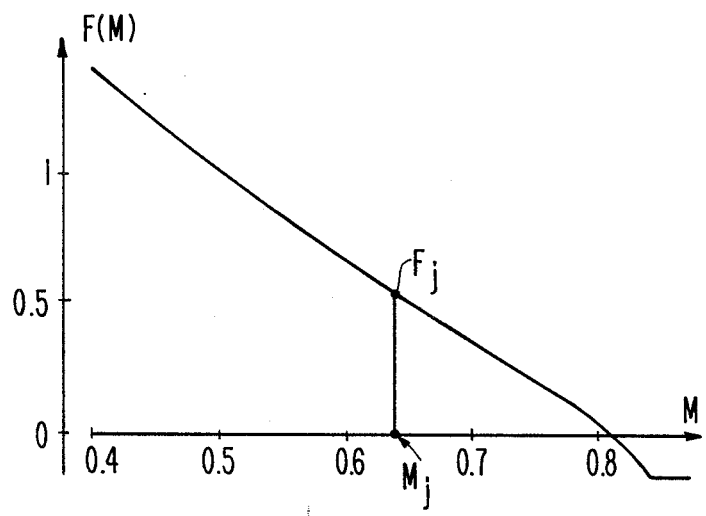
FIGS. 3, 4 and 5 indicate the components of the function K(M,N1).
Figure 4:
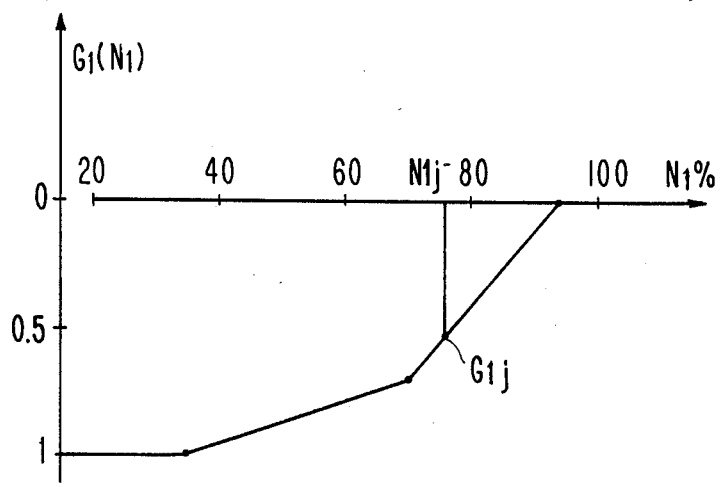
Figure 5:
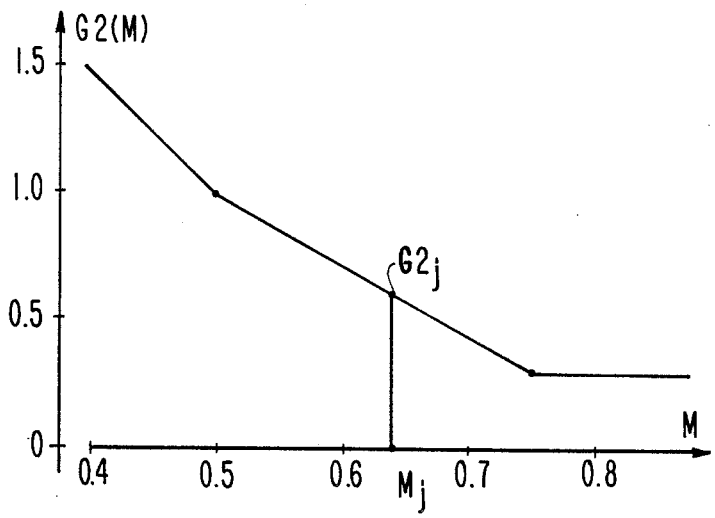
Figure 7:
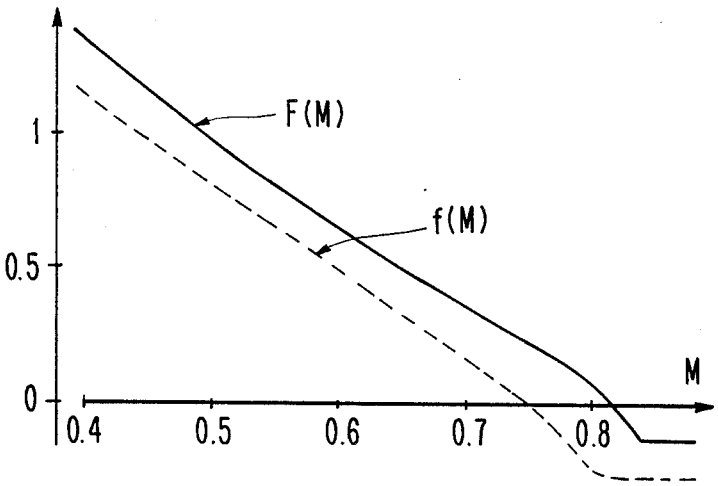
FIG. 7 is a diagram showing components of the functions K(M,N1) and k(M,N1).
Figure 6:
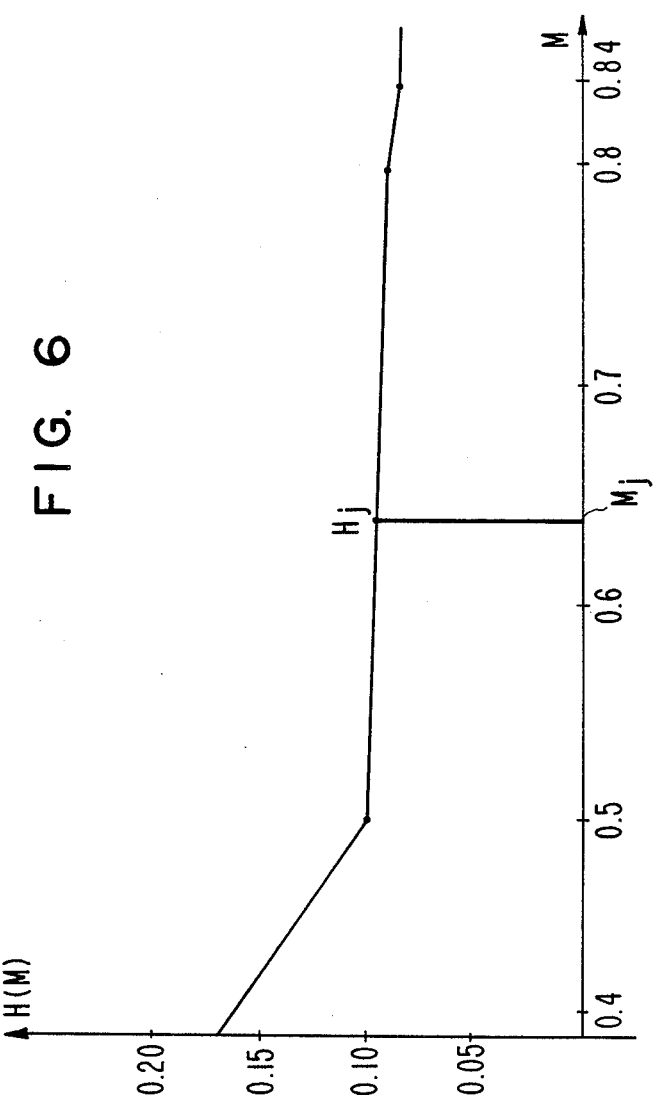
FIG. 6 gives an example of the function H(M).

For example, in the case mentioned above where K(M,N1) is equal to $iHRef = F(M) + G1(N1) \cdot G2(M)$, k(M,N1) may be equal to $f(M) + G1(N1) \cdot G2(M)$. In this particular example, G1(N1) and G2(M) are identical functions in K(M,N1) and in k(M,N1), whilst f(M) is a function of the same form as F(M), but different therefrom. FIG. 7 shows such a function f(M) on a diagram similar to that of FIG. 3 showing the function F(M). In this Figure, it has been assumed that, for all values of M, the function F(M) was greater than function f(M), i.e. the function iHRef was greater than iHlim and therefore that the centre of gravity G lay slightly to the rear of focus F. Of course, the opposite might have been assumed, so that an alarm may be given before the centre of gravity reaches, on moving back, said focus F. Similarly, it goes without saying that the limiting position for the centre of gravity G might be chosen at focus F; in that case, iHlim would be merged with iHRef.

By subtracting member by member equation (9) from equation (8), the following is obtained:

$$x_G - x_G \lim = \frac{iH - iH\lim}{H(M)} \quad (10)$$

It results from this latter equation that, at each instant, the deviation between the real position of the centre of gravity G and a limiting position chosen arbitrarily, but close to the focus, may be determined by comparing the measured instantaneous value of iH with the value iHlim corresponding to $x_G$ lim.

Figure 8:
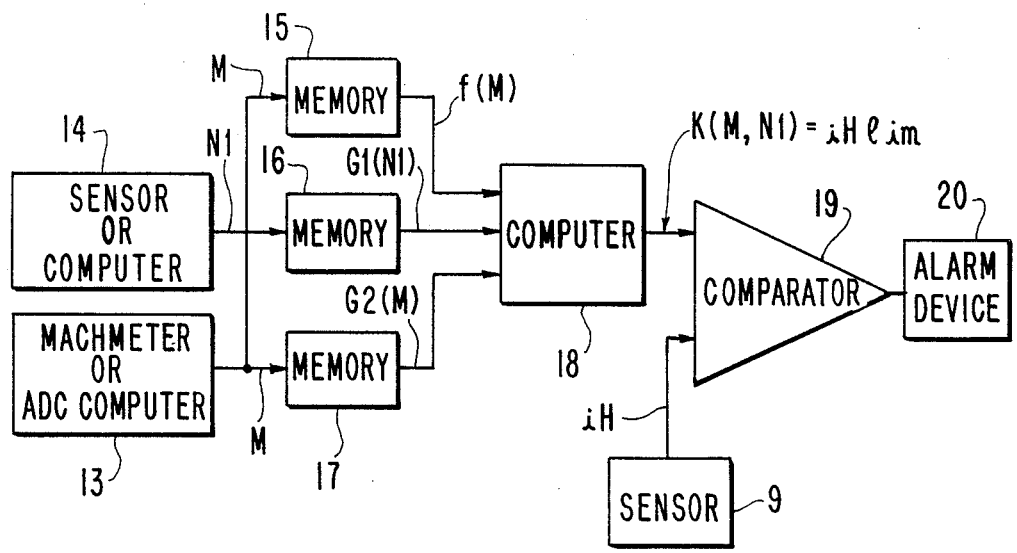
FIG. 8 shows the block diagram of an embodiment of the system for monitoring the position of the centre of gravity, according to the invention.

FIG. 8 shows the block diagram of a system, according to the invention, allowing monitoring of this deviation. This system comprises:

a memory 15 in which is stored the function f(M) and receiving at its input the value M of the Mach number delivered by the Machmeter or ACD computer 13;

a memory 16 in which is stored the function G1(N1) and receiving at its input the value N1 of the speed of the engine 3, coming from detector 14;

a memory 17 in which is stored the function G2(M) and receiving at its input the value M of the Mach number delivered by the device 13;

a computer 18, receiving the three functions f(M), G1(N1) and G2(M) respectively from memories 15, 16 and 17 and delivering at its output the function $k(M,N1) = iH\lim = f(M) + G1(N1) \cdot G2(M)$;

sensor 9 generating signal iH;

a comparator 19 capable of comparing the measured signal iH with the value iHlim and of delivering a signal at its output when iH is greater than iHlim; and an alarm device 20 triggered off by said signal generated by the comparator 19.

It may be advantageous to provide two limiting values iHlim and iHlim' instead of one sole limiting value iHlim. This is for example so if it is desired to generate an alarm graduated as a function of the importance of the rearward movement of the centre of gravity G. For example, in an aircraft in which the focus F and the point of manoeuvre lie respectively at abscissae of 40% and 45% and in which the centering regulator must maintain the abscissa $x_G$ at about 39%, it is advantageous to provide two alarms corresponding respectively to the limiting abscissae $x_G$ lim=41% and $x_G$ lim'=43%. In this way, the limit of 41% may correspond to the maximum error admitted during calculation of the centre of gravity made by the crew before the flight and may necessitate only a partial transfer of fuel from the rear towards the front. On the other hand, the limit of 43% may correspond to an undetected breakdown of the centering regulation system and the fact of exceeding this limit should have for its effect to control a total transfer of fuel from the rear tanks towards the front tank, or the interruption of the transfer from the front tank towards the rear tank.

Figure 9:
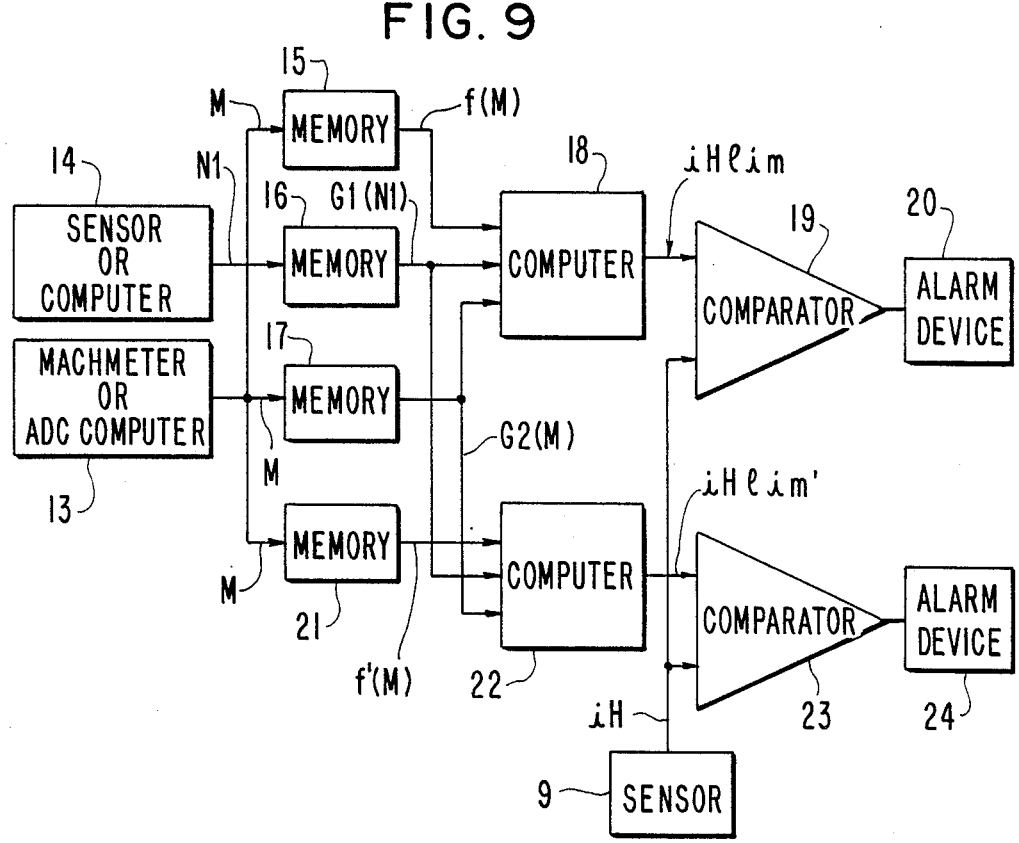
FIG. 9 shows a variant embodiment of the monitoring system.

The block diagram of an embodiment of an alarm system with two thresholds is illustrated in FIG. 9. The arrangement 9 and 13 to 20 of the device of FIG. 7 is found again. The system comprises in addition:

a memory 21, in which is stored a function f'(M) different from f(M), said memory receiving the value M of the Mach number delivered by device 13;

a computer 22 receiving the functions f'(M), G1(N1) and G2(M) respectively from memories 21, 16 and 17 and delivering at its output a limiting value iHlim', different from iHlim;

a comparator 23 capable of comparing the measured value iH delivered by the sensor 9 and the value iHlim'; and an alarm device 24 triggered off by the comparator 23 when iH is greater than iHlim'.

We claim:

1. A system for determining the longitudianl position $X_G$ of the center of gravity G of an aircraft in flight, said aircraft being provided with an adjustable horizontal stabilizer which is deflectable and to which is articulated an elevator, said aircraft having a determined focus F with a longitudinal position $X_F$, speed of engine, Mach number and coefficient of lift, said system comprising:

means for transferring fuel from one tank of the aircraft to another;

angular position sensing means associated with said adjustable horizontal stabilizer for measuring the deflection thereof and delivering said deflection information;

first means for delivering information representative of the speed of the engine of the aircraft;

second means for delivering information representative of the Mach number;

memory means in which are stored a first function of the speed of the engine of the aircraft and the Mach number, said first function being representative of a value of the deflection of said adjustable horizontal stabilizer, in the case where the center of gravity G lies at the focus F of said aircraft and a second function of said Mach number, said second function being representative of a deviation of deflection of said horizontal stabilizer for a deviation of 1 percent from the position of the center of gravity, that is the deviation of deflection for which $X_G - X_F = 1$ percent, said memory means receiving the information delivered by said first and second information delivering means and delivering at the output of the memory means the corresponding values of said functions; and computing means based on the position $X_F$ of the focus F of the aircraft in addition to the information delivered by said memory means as well as that delivered by said angular position sensing means, and, at a point of flight for which the aircraft is in equilibrium with its elevator in aerodynamic extension of said adjustable horizontal stabilizer and when the center of gravity lies near the focus of said aircraft, said computing means generating a center of gravity signal representing the lognitudial position $X_G$ of the aircraft center of gravity G, said signal being delivered to said transfer means in order to control the longitudinal position of the center of gravity of the aircraft, acting on the distribution of fuel among said fuel tanks.

2. A system according to claim 1, wherein said computing means calculate the following equation:

$$X_G = X_F \frac{iH - K(M, N1)}{H(M)}$$

in which:
- $X_G$ is the abscissa of the longitudinal position of the centre of gravity G, measured along the longitudinal axis of the aircraft from a reference origin and referred to the mean aerodynamic chord of the principal wing unit of said aircraft;
- $X_F$ is the abscissa of the position of the centre of gravity G for which the coefficient of lift of the aircraft has no influence on the deflection of equilibrium of the adjustable horizontal stabilizer, that is the position for which said centre of gravity lies at the focus F of the complete aircraft, said abscissa being measured along the longitudinal axis of the aircraft from said reference origin and being referred to said mean aerodynamic chord;
- iH is the measurement, at said point of flight, of a real deflection of the adjustable horizontal stabilizer for the trimmed aircraft;
- K(M,N1) is the first function of the speed of the engine of the aircraft and the Mach number at said point of flight; and
- H(M) is the second function of the Mach number at said point of flight.

3. A system according to claim 2, wherein said first function is a combination of the three following functions each having one variable:
- a function of the Mach number alone, representative of the aerodynamics of the aircraft,
- a function of the engine speed alone, and
- a function of the Mach number alone, representative of the moment of pitch due to the thrust of the engines.

4. A system according to claim 3 wherein there is also:
- means for comparing the information delivered by said angular position sensing means and the information delivered by said memory means, said comparing means delivering a signal at the output thereof when the signal delivered by said sensing means is greater than that delivered by said memory means; and
- alarm means triggered off by the signal generated by said comparing means.

5. A system for controlling the longitudinal position $X_G$ of the centre of gravity G of an aircraft in flight, said aircraft being provided with an adjustable horizontal stabilizer which is deflectable and to which is articulated an elevator, and being provided with fuel tanks, said aircraft having a determined focus F with a longitudinal position $X_F$, speed of engine, and Mach number, said system comprising:
- means for transferring fuel from one tank of the aircraft to another; and
- a device for determining the longitudinal position of the centre of gravity of the aircraft including:
- angular position sensing means associated with said adjustable horizontal stabilizer for measuring the deflection thereof and delivering said deflection information;
- first means for delivering information representative of the speed of the engine of the aircraft;
- second means for delivering information representative of the Mach number,
- memory means in which are stored a first function of the speed of the engine of the aircraft and the Mach number, said first function being representative of a value of the deflection of said adjustable horizontal stabilizer, in the case where the centre of gravity G lies at the focus F of said aircraft and a second function of said Mach number, said second function being representative of a deviation of deflection of said horizontal stabilizer for a deviation of 1 percent from the position of the centre of gravity, that is the deviation of deflection for which $X_G - X_F = 1\%$, said memory means receiving the information delivered by said first and second information delivering means and delivering at the output of the memory means the corresponding values of said functions; and
- computing means based on the position $X_F$ of the focus F of the aircraft in addition to the information delivered by said memory means as well as that delivered by said angular position sensing means, and, at a point of flight for which the aircraft is in equilibrium with its elevator in aerodynamic extension of said adjustable horizontal stabilizer and when the centre of gravity lies near the focus of said aircraft, said computing means generating a centre of gravity signal representing the longitudinal position $X_G$ of the aircraft centre of gravity, said signal being delivered to said transfer means in order to control the longitudinal position of the centre of gravity of the aircraft, acting on the distribution of fuel among said fuel tanks.

6. A system according to claim 5, wherein said transfer means are automatic transfer means.

7. A system according to claim 5, wherein said computing means calculate the following equation:

$$X_G = X_F + \frac{iH - K(M, N1)}{H(M)}$$

in which:
- $X_G$ is the abscissa of the longitudinal position of the centre of gravity G, measured along the longitudinal axis of the aircraft from a reference origin and referred to the mean aerodynamic chord of the principal wing unit of said aircraft;
- $X_F$ is the abscissa of the position of the centre of gravity G for which the coefficient of lift of the aircraft has no influence on the deflection of equilibrium of the adjustable horizontal stabilizer, that is the position for which said centre of gravity lies at the focus F of the complete aircraft, said abscissa being measured along the longitudinal axis of the aircraft from said reference origin and being referred to said mean aerodynamic chord;
- iH is the measurement, at said point of flight, of a real deflection of the adjustable horizontal stabilizer for the aircraft when in a trimmed condition;
- K(M,N1) is the first function of the speed of the engine of the aircraft and the Mach number at said point of flight; and
- H(M) is the second function of the Mach number at said point of flight.

8. A system according to claim 7, wherein said first function is a combination of the three following functions each having one variable:
- a function of the Mach number alone, representative of the aerodynamics of the aircraft,
- a function of the engine speed alone, and
- a function of the Mach number alone, representative of the moment of pitch due to the thrust of the engines.

* * * * *